United States Patent [19]

Marsiat

[11] 4,085,159

[45] Apr. 18, 1978

[54] PROCESS FOR THE PREPARATION OF POWDERED THERMOSETTING COMPOSITIONS BASED ON BRANCHED-CHAIN CARBOXYL GROUP-CONTAINING POLYESTERS AND EPOXY COMPOUNDS

[75] Inventor: Arthur Marsiat, Brussels, Belgium

[73] Assignee: U C B, Societe Anonyme, Saint-Gilles-les-Brussels, Belgium

[21] Appl. No.: 681,342

[22] Filed: Apr. 28, 1976

[30] Foreign Application Priority Data

Apr. 29, 1975 United Kingdom ............... 17740/75

[51] Int. Cl.$^2$ ............................................. C08L 63/00
[52] U.S. Cl. .................................... 260/835; 260/836; 260/837 R
[58] Field of Search ......................................... 260/835

[56] References Cited

U.S. PATENT DOCUMENTS

| | | | |
|---|---|---|---|
| 3,027,279 | 3/1962 | Kurka | 260/835 |
| 3,242,142 | 3/1966 | Hyde | 260/835 |
| 3,397,254 | 8/1968 | Wynstra | 260/835 |
| 3,499,058 | 3/1970 | Kaufman | 260/835 |
| 3,502,620 | 3/1970 | Caldwell | 260/835 |
| 3,548,026 | 12/1970 | Weisfeld | 260/835 |

*Primary Examiner*—Paul Lieberman
*Attorney, Agent, or Firm*—Wenderoth, Lind & Ponack

[57] ABSTRACT

Process for the preparation of powdered thermosetting coating composition suitable for application as paint or varnish on electricity-conducting articles by powder spray methods and fluidized bed coating processes, which comprises: in a first stage, preparing a branched-chain hydroxyl group-containing polyester from at least one dicarboxylic organic acid, at least one polycarboxylic aromatic acid and at least one dihydric organic compound; in a second stage, esterifying the hydroxyl group-containing polyester thus obtained with an aromatic or hydroaromatic dicarboxylic acid to give a carboxyl group-containing polyester having an acid number which is substantially equal to the hydroxyl number of the hydroxyl group-containing polyester obtained in the first stage; and in a third stage, homogenously mixing the carboxyl group-containing polyester obtained in the second stage with an epoxy compound containing at least two epoxy groups, and optionally adding auxiliary substances conventionally used in the manufacture of powdered paints and varnishes; and powdered thermosetting compositions suitable as paint or varnish obtained by this process.

18 Claims, No Drawings

PROCESS FOR THE PREPARATION OF POWDERED THERMOSETTING COMPOSITIONS BASED ON BRANCHED-CHAIN CARBOXYL GROUP-CONTAINING POLYESTERS AND EPOXY COMPOUNDS

The present invention relates to the preparation of powdered thermosetting compositions based on branched-chain carboxyl groupcontaining polyesters and epoxy compounds, as well as to compositions obtained by this process.

For several years, in the field of paints and varnishes, the use of powdered thermosetting compositions, to replace liquid thermosetting compositions, has met with ever-increasing success, justified by the following reasons:

(a) they do not contain any solvents; consequently, problems of intoxication, pollution and fire are avoided.

(b) they are more economical because, as mentioned above, solvents are not used and because excess thermosetting powder which is not fixed on to the substrate to be coated at the time of application may, in principle, be recovered completely.

(c) they permit the formation of thick coatings of up to 100 microns, which cannot be achieved with similar compositions containing solvents.

The powdered, thermosetting compositions are, inter alia, widely used for coating domestic electric appliances, bicycles, garden furniture, accessories for the automobile industry, and the like.

The technique of using powdered thermosetting compositions is very simple: the powders are applied by means of a spray gun on to the article to be coated, which is a conductor of electricity, with an average potential difference of at least 50,000 volts. For this reason, the particles charged with electrostatic electricity form a regular coating on the article, while the excess powder, which does not adhere to the article because of the insulating effect of the particles already retained, may be recovered. The coated article is then heated in an oven where cross-linking of the thermosetting binder of the coating is carried out; in this way, it acquires its final mechanical and chemical properties.

These powdered thermosetting compositions can also be used for the fluidized bed coating technique. The article to be coated is heated and introduced into a fluidized bed of particles of the powdered thermosetting composition, so that the fluidized particles which come into contact with the heated article undergo an initial fusion and are retained on the article by adhesion. The article thus coated is then heated in an oven to carry out cross-linking of the coating in exactly the same way as in the technique described above using an electrostatic spray gun.

Of the various powdered thermosetting compositions which can be used, the present invention particularly relates to those which contain, as binders, carboxyl group-containing polyesters which can be hardened by means of epoxy compounds. More particularly, the present invention relates to a new process for preparing carboxyl group-containing polyesters which are to be hardened by means of epoxy compounds, as well as the carboxyl group-containing polyesters obtained by this process and the thermosetting powdered compositions which can be obtained from these carboxyl group-containing polyesters and epoxy compounds.

According to British Patent Specification No. 1,381,262, a thermosetting coating composition is prepared which comprises (1) a polyepoxide resin, the average molecule of which contains, at least two epoxy groups and (2) a solid, modified polyester resin having an acid number from 30 to 100, this acid polyester resin itself being obtained by the reaction of a polybasic organic carboxylic acid anhydride with a hydroxyl group-containing polyester having a hydroxyl number of from 15 to 50, formed from a dibasic aromatic carboxylic acid and at least one dihydric alcohol component selected from aromatic diols, glycidyl esters and dihydric aliphatic or cycloaliphatic alcohols.

With particular regard to the preparation of the solid, modified polyester resin having an acid number from 30 to 100, there is first prepared a linear hydroxyl group-containing polyester having a hydroxyl number of from 15 to 50 from a bifunctional acid and at least one dihydric alcohol component, whereafter this hydroxyl group-containing linear polyester is esterified with a polybasic organic acid. It will be seen that the solid, modified polyester resin thus obtained has an acid number which is substantially double the hydroxyl number of the hydroxyl group-containing polyester, i.e. an acid number of from 30 to 100 for a hydroxyl number of from 15 to 50.

According to the present invention, we have, surprisingly, found that by starting from practically the same raw materials with the same proportions by weight as in British Patent Specification No. 1,381,262, but by introducing the polycarboxylic organic acid into the hydroxyl group-containing polyester chain and then esterifying the hydroxyl groups of this polyester with an aromatic or hydroaromatic dicarboxylic acid, a branched-chain carboxyl group-containing polyester is obtained which, when used with a compound the molecule of which contains at least two epoxy groups, provides powdered thermosetting compositions which give paint coatings or varnish coatings possessing properties which are distinctly better than those of the corresponding coatings obtained according to British Patent Specification No. 1,381,262.

In contradistinction to the solid, modified polyester resins used in British Patent Specification No. 1,381,262, the carboxyl group-containing polyester resins according to the present invention have a branched polymer chain and possess an acid number which has a value substantially equal to that of the hydroxyl number (and not double it).

It will be observed that in British Patent Specification No. 1,381,262, it states that it is possible to add up to 10 mol % of an aliphatic or aromatic polybasic acid or up to 10 mol % of an at least trihydric aliphatic alcohol for the preparation of the initial hydroxyl group-containing polyester, which means that the polymer chain may also be branched. However, this variant is not illustrated in the Examples of this British Patent Specification which means that the advantages of the process of the present invention have not been disclosed. Furthermore, even on the hypothesis that this embodiment had been illustrated by Examples, the fact remains that the carboxyl group-containing polyesters thus modified would always have an acid number substantially double the hydroxyl number of the hydroxyl group-containing polyester, unlike those prepared according to the present invention.

Consequently, according to the present invention, there is provided a process for the preparation of powdered thermosetting coating compositions suitable for application as paint or varnish on electricity-conducting articles by powder spray methods and fluidized bed coating processes, which comprises: in a first stage, preparing a branched-chain hydroxyl group-containing polyester from at least one dicarboxylic organic acid, at least one polycarboxylic aromatic acid and at least one dihydric organic compound; in a second stage, esterifying the hydroxyl group-containing polyester thus obtained with an aromatic or hydroaromatic dicarboxylic acid to give a carboxyl group-containing polyester having an acid number which is substantially equal to the hydroxyl number of the hydroxyl group-containing polyester obtained in the first stage; and in a third stage, homogenously mixing the carboxyl group-containing polyester obtained in the second stage with an epoxy compound containing at least two epoxy groups, and optionally adding auxiliary substances conventionally used in the manufacture of powdered paints and varnishes.

Hydroxyl Group-Containing Polyester

The dicarboxylic and polycarboxylic organic acids used for the preparation of the branched-chain hydroxyl group-containing polyester may be used in the form of the free acid or their functional derivatives, particularly in the form of the acid anhydride, the acid chloride or an ester of an aliphatic alcohol containing 1 to 4 carbon atoms.

The dicarboxylic organic acid is preferably a dicarboxylic aromatic or hydroaromatic acid. Examples thereof include o-phthalic acid, isophthalic acid, terephthalic acid, dihydrophthalic acid, tetrahydrophthalic acid, hexahydrophthalic acid or the like. However, per 100 equivalents of the carboxyl groups of the dicarboxylic organic acid used in the first stage, 1 to 15, preferably 5 to 10 equivalents of the carboxyl groups may be those of at least one aliphatic or cycloaliphatic acid such as succinic, glutaric, adipic, sebacic, cyclohexane-1,2-dicarboxylic cyclohexane-1,4-dicarboxylic acids or their functional derivatives, the remainder being those of the dicarboxylic aromatic or hydroaromatic acid.

The aromatic tricarboxylic or polycarboxylic acid may be, for example, trimellitic acid, pyromellitic acid or the like, or their functional derivatives.

The ratio of carboxyl equivalents of the polycarboxylic aromatic acids to the carboxyl equivalents of the dicarboxylic organic acids used in the first stage is preferably 5:95 to 35:65, more preferably 10:90 to 25:75.

The dihydric organic compound may be, for example, ethylene glycol, diethylene glycol, triethylene glycol, 1,2-propanediol, 1,3-propanediol, 1,4-butanediol, neopentyl glycol, cyclohexane-1,4-dimethanol or the like.

The amount of the dihydric organic compound relative to the total amount of the organic carboxylic acids used in the preparation of the hydroxyl group-containing polyester is such that the hydroxyl number of the resulting polyester is 50 to 100 mg KOH/g of this polyester.

The hydroxyl group-containing polyester may be prepared by conventional methods for the synthesis of polyester (cf. Kirk-Othmer, Encyclopaedia of Chemical Technology, 2nd edition, volume 16, pages 159–189, pub. Interscience, New York 1968). Generally speaking, use is made of a conventional reactor equipped with a thermometer, a stirrer, an inlet and outlet for inert gas, a condenser and an azeotropic separator (for example of the Dean-Stark type). The dicarboxylic and polycarboxylic acids (or their functional derivatives) and an excess of the dihydric organic compound are introduced into the reactor at the same time, subsequently or portionwise and polyesterification is carried out at a temperature which is gradually increased to about 210° to 220° C., initially at atmospheric pressure and then under reduced pressure, maintaining these operating conditions until a polyester is obtained which has the desired hydroxyl number, which may be between 50 and 100 mg of KOH per g of polyester, and has the desired molecular weight, which may be between 1000 and 3000, according to the reactants employed. The hydroxyl group-containing polyester may be removed from the reactor in a molten state and then stored at ambient temperature. However, the hydroxyl group-containing polyester is preferably left in the reactor and the preparation of the carboxyl group-containing polyester is carried out directly.

Carboxyl Group-Containing Polyester

To the hydroxyl group-containing polyester obtained as above, which is in the above described reactor, is added the calculated amount of aromatic or hydroaromatic dicarboxylic acid (or anhydride) (e.g. any of such acids mentioned above) and polyesterification is continued at a temperature of 170° to 210° C until a carboxyl group-containing polyester is obtained with the desired acid number, which may be between 50 and 100 mg of KOH per g of carboxyl group-containing polyester, and with the desired molecular weight, which may be between 1000 and 3000, according to the reactants employed. The carboxyl group-containing polyester is then cast into a thick layer and allowed to cool, whereafter it is crushed to give particles with an average size of from a fraction of a millimeter to a few millimeters.

Powdered Thermosetting Composition

The carboxyl group-containing polyester obtained in the previous stage is homogeneously mixed with the epoxy compound, as well as possibly with the various auxiliary substances conventionally used for the manufacture of powdered paints and varnishes suitable for application by powder spray methods and fluidized bed coating processes. Homogenization is carried out, for example, by melting the carboxyl group-containing polyester and the epoxy compound at a temperature lower than that at which a reaction takes place between these two substances, this temperature preferably being within the range of from about 80° C to about 120° C. When complete homogenization has been achieved, the mixture is allowed to cool and is then ground to a powder, the particle size of which is between 0.1 and 250 μ.

Instead of the above method, it is also possible to dissolve the resinous compounds in a solvent, add other insoluble compounds to the solution and grind the mixture to give a homogeneous suspension, whereafter the solvent is evaporated, for example by spray drying.

The epoxy compound used above can be a solid monomeric epoxy compound containing at least two epoxy groups, for example, triglycidyl isocyanurate, or a solid polyepoxide resin, for example, the products marketed by "Shell" under the name "Epikote" 1001, "Epikote" 1004, the product marketed by CIBA-GEIGY under the name "Araldite GT 7004" or the like. This epoxy compound may be used in an amount of from 0.7 to 1.3, preferably 0.95 to 1.1, equivalents of epoxy groups per equivalent of carboxyl groups in the carboxyl group-containing polyester.

The auxiliary substances which may be added to the powdered thermosetting compositions according to the present invention include, for example, pigments, such as titanium dioxide, yellow iron oxide, red iron oxide, organic dyestuffs or the like, flow control agents, such as Ketonharz (BASF) which is a ketone resin based on cyclohexanone, or Modaflow (MONSANTO) which is a polyethylhexyl acrylate, surface active agents, such as Zonyl-S-13 (E. I. du PONT de NEMOURS & Co.), plasticizers, such as dibutyl phthalate or tributyl phosphate, and/or grinding aids, and the like. These auxiliary substances are used in their usual effective proportions, it being understood that if the compositions according to the invention are to be used as varnishes, then the addition of auxiliary substances which possess opacifying properties will be omitted.

The following Examples are given for the purpose of illustrating the present invention:

EXAMPLE 1

(Comparative)

The following compounds are introduced into a reactor of the type described above:

| | |
|---|---|
| ethylene glycol | 102.6 g (1.65 moles) |
| neopentylglycol | 734.2 g (6.8 moles) |
| dimethyl terephthalate | 1010.0 g (5 moles) |

Transesterification is carried out at 210°–220° C, initially at atmospheric pressure and then under reduced pressure, until all methanol has been entirely distilled off (about 320 g = 10 moles). 397.3 g (2.6 moles) tetrahydrophthalic anhydride are then introduced, whereafter esterification is carried out under the same conditions as described above until the hydroxyl number is equal to 39 mg of KOH per g polyester.

Esterification of these residual hydroxyl groups with trimellitic anhydride is carried out by adding to the resin obtained as above, 249.6 g (1.3 moles) trimellitic anhydride.

Esterification is continued until the acid number is 71 mg of KOH per g polyester and the melt index according to ASTM D 1238/62 T is 33 g in 10 minutes at 125° C using a 2.09 mm die. The polyester is then cast at 200° C into a thick film, cooled and ground into granules with an average size of between 0.5 and 2 mm.

EXAMPLE 2

(According to the Invention)

The following compounds are introduced into the reactor as in Example 1:

| | |
|---|---|
| ethylene glycol | 102.6 g (1.65 moles) |
| neopentylglycol | 734.2 g (6.89 moles) |
| dimethyl terephtalate | 1010 g (5 moles) |

Transesterification is carried out at 210°–220° C until all of the methanol has been distilled off (i.e. 320 g = 10 moles).

Then, in order to carry out the chain branching 249.6 g (1.3 moles) trimellitic anhydride are added and the esterification is continued until the hydroxyl number reaches a value of ± 88 mg KOH per g polyester.

Esterification of the hydroxyl groups of the branched polyester thus obtained is carried out by introducing into the reactor 397.3 g (2.6 moles) tetrahydrophthalic anhydride.

The esterification is continued at 210° C until the acid number is 60 mg KOH per g polyester and the melt index is 30 g in 10 minutes at 125° C (2.09 mm die).

The polyester is then cast into a thick film, as in Example 1.

The polyesters obtained according to the processes of Examples 1 and 2 are formulated as follows into pigmented powders, which can be used in electrostatic powder-spray coating processes:

580 parts by weight of each of the polyesters described in the above two Examples are mixed with 68 parts by weight of powdered triglycidyl isocyanurate, 300 parts by weight of titanium dioxide (Kronos 220 of the firm Titan Gesellschaft) and the various additives listed below:

29 parts by weight of Epikote 1004 (Shell) (epoxy resin)
3.5 parts by weight of benzoin
8.8 parts by weight of polyethylhexyl acrylate: Modaflow (Monsanto) (flow agent)
0.03 parts by weight of dyestuff: Hostaperm violet RL special (Farbwerke Hoechst).

After homogenization at a temperature of about 110°–128° C, the mixtures are ground into particles of 0.1 to 250 μ and are applied to bonderized steel having a thickness of 0.65 mm, using a spray gun, in an electrostatic field at a voltage of 55 KV.

The thickness of the coating thus formed is 95 microns. The steel plate thus coated is then brought to a temperature of 200° C for 20 minutes to enable the coating to cross-link.

The advantage of the products obtained by the process according to the present invention, as described in Example 2 above, is demonstrated by a comparison of the properties of the coatings obtained therewith with those of the comparative Example 1:

| | Formulation based on the carboxyl group containing polyester of: | |
|---|---|---|
| Tests | Example 1 | Example 2 |
| appearance | orange peel | excellent |
| "Erichsen test" (DIN 53156) | 8.5 mm | 9.5 mm |
| inverse impact (Gardner Impact Test, Steel Kitchen Cabinet Institute 1949) | zero kg/cm | 30 kg/cm |
| gloss (ASTM D 523-67) at 60° | 90% | 93% |
| bending on a conical mandrel (φ=4 mm) (ASTM D 522-60) | cracks | excellent |
| cross-cut adhesion test (Gitterschnitt: DIN 53151) | GTO | GTO |

GTO = none of the parts of the coating has been stripped off.

EXAMPLE 3

(Comparative)

189 g ethylene glycol, 1076 g neopentyl glycol, 134 g 1,6-hexanediol and 1803 g terephthalic acid are introduced into a 5 liter glass reactor provided with a stirrer and a fractionation column. The mixture is heated to 150° C and 1 g dibutyl-tin oxide is added. The temperature is gradually raised to 220° C and this temperature is maintained for 7 hours until 415 g water separate off and a clear resin is obtained having a hydroxyl number of 132 and an acid number of 4. The mixture is cooled to 170° C and 462 g hexahydrophthalic anhydride are introduced. Esterification is carried out at 210° C giving a hydroxyl group-containing resin having a hydroxyl number of 25 and an acid number of 8.

230 g trimellitic anhydride are introduced at 180° C and the temperature of the reaction mixture is raised to 200° C. Polycondensation is continued in vacuo until a carboxyl group-containing resin is obtained having an acid number of 49, a softening temperature of 100°–102° C and a melt index of 24 g in 10 minutes at 125° C.

EXAMPLE 4

(According to the Invention)

The same amounts of the same starting materials are used as in Example 3 but a branched-chain hydroxyl group-containing polyester is prepared from 189 g ethylene glycol, 1076 g neopentyl glycol and 134 g 1,6-hexanediol on one hand and 1803 g terephthalic acid and 230 g trimellitic anhydride on the other hand. The branched-chain hydroxyl group-containing polyester thus obtained by heating to 220° C has a hydroxyl number of 85 and an acid number of 28, i.e. a relative hydroxyl number of 85−28=57.

462 g hexahydrophthalic anhydride are introduced at 170°–180° C and polycondensation is continued in vacuo until a carboxyl group-containing polyester is obtained having an acid number of 51, a melt index of 20 g at 125° C and a softening point of 95°–97° C.

The carboxyl group-containing polyesters obtained in Examples 3 and 4 are then formulated into pigmented electrostatic powders in the following manner:

1000 parts by weight of each of the two carboxyl group-containing polyesters is extruded in a Buss-Ko-Kneter PR 46 extruder at 100° C together with 110 parts by weight of triglycidyl isocyanurate, 1120 parts by weight of titanium dioxide (Kronos CL 220), 10 parts by weight of polyethylhexyl acrylate (Modaflow of MONSANTO) and 0.07 parts by weight of dyestuff (Hostaperm violet RL Special).

After grinding and sifting at 100 microns, the powders thus obtained are applied to bonderized steel having a thickness of 0.65 mm, using a spray gun, in an electrostatic field at a voltage of 55 KV. The thickness of the coating is 60 microns. The applied layers are then cured for 15 minutes at 200° C and then subjected to the following tests:

| Tests | Formulation based on the carboxyl group containing polyester of: | |
|---|---|---|
| | Example 3 | Example 4 |
| appearance | pronounced orange peel | well taut surface |
| "Erichsen test" (DIN 53156) | 7 mm | 9.5 mm |
| inverse impact (Gardner Impact Test, Steel Kitchen Cabinet Institute 1949) | 60 kg/cm | 80 kg/cm |
| gloss (ASTM D 523–67) at 60° | 85% | 95% |
| bending on a conical mandrel | cracks at 7 mm | passes 3 mm |
| cross-cut adhesion test (Gitterschnitt: DIN 53151) | Gt0 | Gt0 |
| reactivity on the Brabender plastograph at 180° C: | | |
| beginning of gel | <1 minute | 4.5 minutes |
| maximum gel | 2.5 minutes | 9.5 minutes |

The delayed gelling of the powder according to the invention, as compared to that of the comparative Example 3, offers a considerable advantage, as the varnish layer thus has more time to spread out and results in a flawless taut surface.

EXAMPLE 5

(Comparative)

1803 g terephthalic acid and 498 g isophthalic acid are added to the glycols mentioned in Example 3. After condensation, the hydroxyl group-containing resin has an acid number of 14.5 and a hydroxyl number of 30.

230 g trimellitic anhydride are then introduced at 170° C and after esterification at atmospheric pressure, heating is continued in vacuo until a melt index of 15 g at 125° C is obtained. At that moment the final carboxyl group-containing resin has an acid number of 55.

EXAMPLE 6

(According to the Invention)

The mixture of glycols mentioned in Example 3 is esterified with 1803 g terephthalic acid. A clear resin is obtained with an acid number of 4 and a hydroxyl number of 133. This resin is then condensed with 230 g trimellitic anhydride at a temperature of from 170° to 220° C. A hydroxyl group-containing polyester is thus obtained with an acid number of 20 and a hydroxyl number of 76 (i.e. a relative hydroxyl number of 76−20=56).

The hydroxyl group-containing polyester resin is esterified until clarification occurs, at atmospheric pressure at maximum 215° C with 498 g isophthalic acid. The reaction is continued in vacuo until the melt index is 19. The final carboxyl group-containing polyester has an acid number of 50.

The carboxyl group-containing polyesters of Examples 5 and 6 respectively are formulated into electrostatic powders in the following manner:

1000 parts by weight of each of the two carboxyl group-containing polyesters are extruded in a Buss-Ko-Kneter PR 46 extruder together with 110 parts by weight of triglycidyl isocyanurate, 1120 parts by weight of titanium dioxide (Kronos CL 220), 10 parts by weight of polyethylhexyl acrylate (Modaflow) and 0.07 parts by weight of dyestuff (Hostaperm violet RL Special).

The electrostatic powders thus obtained are applied to bonderized steel, under the same conditions as in Example 2, with a thickness of 60 microns. They are subjected to the following tests:

| Tests | Formulation based on the carboxyl group containing polyester of: | |
|---|---|---|
| | Example 5 | Example 6 |
| appearance | orange peel | slight orange peel |
| inverse impact (Gardner Impact Test, Steel Kitchen Cabinet Institute 1949) | 60 kg/cm | 80 kg/cm |
| gloss (ASTM D 523–67) at 60° | 90% | 95% |
| reactivity on the Brabender plastograph at 180° C: | | |
| beginning of gel | 1.5 minutes | 4 minutes |
| maximum gel | 4 minutes | 6.5 minutes |

EXAMPLE 7

1000 parts by weight of the carboxyl group-containing polyester obtained in Example 4 are formulated together with 880 parts by weight of a polyepoxide resin (Araldite GT 7004 of CIBA-GEIGY), 2100 parts by weight of titanium dioxide (Kronos CL 220), 21 parts by weight of polyethylhexyl acrylate (Modaflow) and 4 parts by weight of a hardening agent which is an imidazole derivative (VEBA B 31). After application of the ground and sifted electrostatic powder on bonderized steel under the same conditions as in Example 2, followed by curing in an oven at 190° C for 10 minutes, coatings of 100 microns thick are subjected to the following tests:

| Tests | Resin of Example 7 |
|---|---|
| appearance | well taut surface |
| "Erichsen test" (DIN 53156) | 9.5 mm |
| inverse impact | >80 kg/cm |
| gloss at 60°(ASTM D 523 -67) | 95% |
| cross-cut adhesion test (Gitterschmitt DIN 53151) | Gt0 |

EXAMPLE 8

The 880 parts by weight of Araldite GT 7004 of Example 7 are replaced by 940 parts by weight of another polyepoxide resin (Epikote 1004 of SHELL), all other conditions of Example 7 remaining unchanged. An electrostatic powder is obtained which gives coatings having pratically the same properties as those obtained with the electrostatic powder described in Example 7.

We claim:

1. A process for the preparation of a powdered thermosetting coating composition suitable for application as paint or varnish or electricity-conducting articles by electrostatic powder spray or fluidized bed coating processes, which comprises in a first stage, preparing a branched-chain hydroxyl group-containing polyester having a hydroxyl number between 50 and 100 by reacting (1) at least one aromatic dicarboxylic acid, (2) at least one aromatic tricarboxylic acid or pyromellitic acid and (3) an excess of at least one organic dihydric compound, the ratio of carboxyl equivalents of the tricarboxylic acid or pyromellitic acid to carboxyl equivalents of the dicarboxylic acid being from 5:95 to 35:65;

in a second stage, esterifying said branched-chain hydroxyl group-containing polyester with an aromatic or hydro-aromatic dicarboxylic acid to produce a branched-chain carboxyl group-containing polyester having a molecular weight of from 1,000 to 3,000 and an acid number between 50 and 100, which acid number is substantially equal to the hydroxyl number of said hydroxyl group-containing polyester;

in a third stage, homogeneously mixing said branched-chain carboxyl group-containing polyester with a solid epoxy compound containing at least two epoxy groups, the ratio of said epoxy compound to said carboxyl group-containing polyester being such that there are 0.7 to 1.3 equivalents of epoxy groups per equivalent of carboxyl groups in said carboxyl group-containing polyester; and converting the resulting homogeneous mixture into a powder.

2. A process according to claim 1, wherein the aromatic dicarboxylic acid is o-phthalic acid, isophthalic acid or terephthalic acid, in the form of the free acid, acid anhydride, acid chloride or ester of an aliphatic alcohol containing 1 to 4 carbon atoms.

3. A process according to claim 1, wherein the hydroaromatic dicarboxylic acid is dihydrophthalic acid, tetrahydrophthalic acid or hexahydrophthalic acid, in the form of the free acid, acid anhydride, acid chloride or ester of an aliphatic alcohol containing 1 to 4 carbon atoms.

4. A process according to claim 1, wherein at least one aliphatic or cycloaliphatic dicarboxylic acid is used in preparing the branched-chain hydroxyl group-containing polyester, the amount of carboxyl groups in said aliphatic or cycloaliphatic dicarboxylic acid component being 1 to 15 equivalents per 100 equivalents of the total of the carboxyl groups in said aliphatic or cycloaliphatic dicarboxylic acid component and the carboxyl groups in the aromatic dicarboxylic acid component.

5. A process according to claim 4, wherein the aliphatic dicarboxylic acid is succinic acid, glutaric acid, adipic acid or sebacic acid, in the form of the free acid, acid anhydride, acid chloride or ester of an aliphatic alcohol containing 1 to 4 carbon atoms.

6. A process according to claim 4, wherein the cycloaliphatic dicarboxylic acid is cyclohexane-1,2-dicarboxylic acid or cyclohexane-1,4-dicarboxylic acid, in the form of the free acid, acid anhydride, acid chloride or ester of an aliphatic alcohol containing 1 to 4 carbon atoms.

7. A process according to claim 4 wherein the amount of carboxyl groups in said aliphatic or cycloaliphatic dicarboxylic acid component is 5 to 10 equivalents per 100 equivalents of the total of the carboxyl groups in said aliphatic or cycloaliphatic dicarboxylic acid component and the carboxyl groups in the aromatic dicarboxylic acid component.

8. A process according to claim 1, wherein the aromatic tricarboxylic acid is trimellitic acid, in the form of the free acid or acid anhydride.

9. A process according to claim 1, wherein, in the first stage, the ratio of carboxyl equivalents of the tricarboxylic acid or pyromellitic acid to carboxyl equivalents of the dicarboxylic acid is 10:90 to 25:75.

10. A process according to claim 1, wherein the organic dihydric compound is ethylene glycol, diethylene glycol, triethylene glycol, 1,2-propanediol, 1,3-propanediol, 1,4-butanediol, 1,6-hexanediol, neopentyl glycol or cyclohexane-1,4-dimethanol.

11. A process according to claim 1, wherein the branched-chain hydroxyl group-containing polyester has a molecular weight of from 1,000 to 3,000.

12. A process according to claim 1, wherein the epoxy compound is triglycidyl isocyanurate.

13. A process according to claim 1, wherein the ratio of the epoxy compound to the carboxyl group-containing polyester is such that there are 0.95 to 1.1 equivalents of epoxy groups per equivalent of carboxyl groups in the carboxyl group-containing polyester.

14. A process according to claim 1, wherein the powder has a particle size between 0.1 and 250 microns.

15. A powdered thermosetting coating composition prepared by the process of claim 1.

16. An electricity-conducting article coated with a composition according to claim 15.

17. A powdered thermosetting coating composition suitable for application as paint or varnish on electricity-conducting articles by electrostatic powder spray or fluidized bed coating processes, which comprises (1) a branched-chain carboxyl group-containing polyester having a molecular weight of from 1,000 to 3,000 and an acid number between 50 and 100, said branched-chain carboxyl group-containing polyester being the esterification product of an aromatic or hydroaromatic dicarboxylic acid or anhydride with a branched-chain hydroxyl group-containing polyester having a hydroxyl number between 50 and 100, said branched-chain hydroxyl group-containing polyester being the reaction product of (1) at least one aromatic dicarboxylic acid, (2) at least one aromatic tricarboxylic acid or pyromellitic acid and (3) an excess of at least one organic dihydric compound, the ratio of carboxyl equivalents of the tricarboxylic acid or pyromellitic acid to carboxyl equivalents of the dicarboxylic acid in said hydroxyl group-containing polyester being from 5:95 to 35:65, and (2) a solid epoxy compound containing at least two epoxy groups, the ratio of said epoxy compound to said carboxyl group-containing polyester being such that there are 0.7 to 1.3 equivalents of epoxy groups per equivalent of carboxyl groups in said carboxyl group-containing polyester.

18. An electricity-conducting article coated with a composition according to claim 17.

* * * * *